US008645763B2

(12) United States Patent
Szegedi et al.

(10) Patent No.: US 8,645,763 B2
(45) Date of Patent: Feb. 4, 2014

(54) MEMORY DUMP WITH EXPANDED DATA AND USER PRIVACY PROTECTION

(75) Inventors: Miklos Szegedi, Redmond, WA (US); Ryan S. Kivett, Redmond, WA (US); Gregory W. Nichols, Bellevue, WA (US); Mikhail Basilyan, Seattle, WA (US); Jen-Lung Chiu, Redmond, WA (US); Genghis Karimov, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 211 days.

(21) Appl. No.: 13/230,588

(22) Filed: Sep. 12, 2011

(65) Prior Publication Data

US 2013/0067285 A1    Mar. 14, 2013

(51) Int. Cl.
G06F 11/00    (2006.01)
(52) U.S. Cl.
USPC .......................................... 714/38.11; 726/26
(58) Field of Classification Search
USPC .......................................... 714/38.11; 726/26
See application file for complete search history.

(56) References Cited

U.S. PATENT DOCUMENTS

| 5,809,542 | A  | 9/1998  | Tsuboi et al. |
| 6,182,243 | B1 | 1/2001  | Berthe et al. |
| 6,321,295 | B1 | 11/2001 | Vincent |
| 6,553,347 | B1 | 4/2003  | Tavor et al. |
| 7,028,056 | B1 | 4/2006  | Hendel et al. |
| 7,062,681 | B2 | 6/2006  | Larsson et al. |
| 7,290,175 | B1 | 10/2007 | Kessler et al. |
| 7,380,171 | B2 * | 5/2008 | Prescott et al. ............ 714/38.11 |
| 7,607,123 | B2 | 10/2009 | Chavan |
| 7,702,959 | B2 | 4/2010  | Hwang et al. |
| 7,873,875 | B2 | 1/2011  | Sato et al. |
| 2004/0128523 | A1 | 7/2004 | Fujioka |
| 2006/0265375 | A1 | 11/2006 | Hess |
| 2007/0011450 | A1 | 1/2007 | Mccreight et al. |
| 2008/0126301 | A1 | 5/2008 | Bank et al. |
| 2008/0294839 | A1 | 11/2008 | Bell et al. |
| 2009/0254999 | A1 * | 10/2009 | Julin et al. ...................... 726/28 |
| 2009/0282036 | A1 | 11/2009 | Fedtke |
| 2009/0327809 | A1 | 12/2009 | Joy et al. |
| 2010/0070805 | A1 | 3/2010 | Chang et al. |
| 2011/0040808 | A1 * | 2/2011 | Joy et al. ........................ 707/812 |

(Continued)

OTHER PUBLICATIONS

Notice of Allowance dated Apr. 2, 2013 from U.S. Appl. No. 13/230,617; 9 pages.

(Continued)

*Primary Examiner* — Scott Baderman
*Assistant Examiner* — Joseph Kudirka
(74) *Attorney, Agent, or Firm* — Andrew Sanders; Micky Minhas (57) ABSTRACT

A system and method for generating a triage dump of useful memory data from a computer that encounters an error while executing one or more software programs. The computer system may identify data values within the triage dump that are characteristic of personal data. To protect the privacy of the software user the personal data may be poisoned by overwriting the data values with overwrite values. The overwrite values used to poison the data values may be predetermined, based on the data values themselves, or chosen at random. The triage dump may be sent to an external server to associated with the developer of the one or more software programs for analysis. When overwrite values are dynamically selected, the specific overwrite values used may be sent to the server in connection with a triage dump.

16 Claims, 7 Drawing Sheets

(56) References Cited

U.S. PATENT DOCUMENTS

| | | |
|---|---|---|
| 2011/0138219 A1 | 6/2011 | Walton et al. |
| 2012/0144477 A1 | 6/2012 | Katayama |
| 2012/0224695 A1 | 9/2012 | Hashimoto et al. |

OTHER PUBLICATIONS

Lönnberg et al., "Java Replay for Dependence-based Debugging," *PADTAD '11 Proc. of Workshop on Parallel and Distributed Systems: Testing, Analysis, and Debugging*, Toronto, Canada, Jul. 17, 2011, pp. 15-25.

Qi et al., "Darwin: An Approach for Debugging Evolving Programs," *ESEC/FSE '09 Proc. 7th Joint Meeting of European Software Engineering Conference and ACM SIGSOFT Symposium on the Foundations of Software Engineering*, Amsterdam, The Netherlands, Aug. 23-28, 2009, pp. 33-42.

"International Search Report", Mailed Date: Sep. 26, 2012, Application No. PCT/US2011/055517, Filed Date: Oct. 9, 2011, pp. 8.

Castro et al., "Better Bug Reporting with Better Privacy," Proc. ACM SIGARCH Computer Architecture News ASPLOS '08, Mar. 1-5, 2008, Seattle, Washington USA, 10 pages, http://research.microsoft.com/en-us/proiects/betterbug/castro08better.pdf.

Glerum et al., "Debugging in the (Very) Large: Ten Years of Implementation and Experience," SOSP '09 Proc. ACM SIGOPS 22nd Symposium on Operating Systems Principles, Oct. 11-14, 2009, Big Sky, Montana, USA, pp. 1-17, http://citeseerx.ist.psu.edu/viewdoc/download?doi=10.1.1.148.716&rep=rep1&type=pdf.

Tallam, Sriraman; "Research Statement;" publisher: Sriraman Tallam; 2007 (It is noted that 2007 is sufficiently earlier than the effective U.S. filing date and any foreign priority date so that the particular month of publication is not in issue); pp. 1-4; Tucson, AZ.

\* cited by examiner

| VALUE 440 | ADDRESS 450 |
|---|---|
| | 999 |
| | 998 |
| | 997 |
| | ... |
| | 704 |
| | 703 |
| | 702 |
| ... | 701 |
| | ... |
| 0 | 507 |
| 9 | 506 |
| 1 | 505 |
| 5 | 504 |
| 1 | 503 |
| 2 | 502 |
| 0 | 501 |
| | 500 |
| | ... |
| | 302 |
| | 301 |
| | 300 |
| | ... |
| | 205 |
| | 204 |
| | 203 |
| | 202 |
| | 201 |
| | 200 |
| | 199 |
| | ... |
| | 106 |
| | 105 |
| | 104 |
| | 103 |
| | 102 |
| | 101 |
| | 100 |
| | ... |
| | 005 |
| | 004 |
| | 003 |
| | 002 |
| | 001 |
| | 000 |

Call Stack 430 spans addresses 501–701 with values (501–507): 0, 3, 3, 6, 2, 6, 8 / 0, 0, 0, 5, 0, 0, 9 / 0, 2, 1, 5, 1, 9, 0 (columns shown as 0215190 / 0005900? — reproduced as visible)

Library Code 420 spans addresses 200–301.

Program Code 410 spans addresses 003–104.

MEMORY DUMP WITH EXPANDED DATA AND USER PRIVACY PROTECTION

BACKGROUND

Modern computer software developers are continually improving and updating software, even after the software is released to users. Existing network infrastructure, such as the Internet, allows the software developers to send software updates to the users quickly and frequently, if need be. The Internet also allows the users to provide feedback to the software developer regarding problems that may arise while executing the software. This feedback may be manual feedback sent by express action of the user. Though, some operating systems include an agent of an error reporting system, which may provide automated feedback if the user gives consent for the user's operating system to send such information. This feedback may include useful information about the operating environment at the time a software program crashes or hangs and allows the software developer to investigate and fix any bugs in the software.

When feedback is sent automatically by the operating system, the information sent may be a "dump" of information collected from the computer to define the operating state at the computer at the time of a crash or other performance problem. It is useful to include at least a portion of the contents of memory in the dump. This information, sometimes, called a memory dump, reveals the state of the working memory at a particular time.

The memory dump allows the software developers to perform investigation into the cause of a crash or a hang. However, a full memory dump in modern computer systems is excessively large and not all of the information contained therein is particularly useful to software developers. Thus, only a portion of the memory dump may be sent.

Content from different amounts of memory may be sent in different scenarios. In some scenarios, a report of an error may include enough of the contents of memory to aid in identifying that a particular software application has a problem. The software may have any of a number of problems. For example, there could exist problems with performance, reliability, stability, security or compatibility. Such a dump is sometimes called a "triage dump." Based on analysis of the triage dump, a software developer may configure the error reporting system to collect more detailed information for inclusion in error reports.

SUMMARY

Described herein are techniques for sending memory dump data from a user's computer as part of an error reporting system. The memory dump may contain information useful in identifying a cause of an operating error while reducing the risk that user-specific personal data is included in the memory dump data. To reduce the risk of user-specific personal being included in the memory dump, portions of memory that contain data characteristic of personal data are "poisoned" by overwriting the data values with overwrite values.

The overwrite values may be selected to increase the value of the memory dump data in identifying a cause of an error. In some embodiments, the overwrite value may be selected to allow differentiation between memory locations that have been overwritten and memory locations in which information has been retained without being overwritten. In some embodiments, data values characteristic of pointers are retained in the memory dump, without overwrite, and an overwrite value is selected so as to be different than a possible pointer value. As a specific example, an overwrite value may be selected to allow differentiation between locations where the value has been overwritten and locations storing a null pointer.

In some embodiments, an overwrite value may be selected as a predetermined function of the data value being overwritten. In some embodiments, the overwrite values may be chosen at random.

In some embodiments, a computer system uses a triage dumping engine to generate a triage dump in response to a computer program crashing or hanging. An identification engine of the triage dumping engine identifies a plurality of data values that are characteristic of personal information. An overwrite engine overwrites each identified data value with a an overwrite value. The overwrite value may not correspond to the value used by the computer system as a null pointer value. Once generated, the triage dump may be sent to an external server.

In some embodiments, the overwrite value may be determined based on the data value being overwritten. For example, if the data value being overwritten falls within a first predetermined range, the overwrite engine may overwrite the data value with a first overwrite value. Whereas, if the data value being overwritten falls within a second predetermined range, the overwrite engine may overwrite the data value with a second overwrite value.

In some embodiments, a selection engine determines the overwrite value. The selection engine may use a random number generator to select the various overwrite values. The data values that are overwritten and their corresponding overwrite values may be stored in a table that tracks the mapping of how the data values are poisoned. The portion of the table containing overwrite values may be sent to an external server to provide additional information used for analyzing the triage dump without compromising the user's privacy.

In some embodiments, a server receives a triage dump from a remote computer. The triage dump comprises pointer data, which is useful for analyzing the cause of program crashes and hangs. The triage dump may also comprise poisoned data values that represent potentially personal information that was overwritten with overwrite values to prevent the dissemination of personal data. The triage dump may also comprise null pointer data, which is distinguishable from poisoned data because data values are never poisoned using the null pointer value.

In some embodiments, a server receives a list of values comprising overwrite values used to poison data of the triage dump. Each overwrite value may be traced through the call stack of the program that encountered a problem. This may allow software developers to identify the function within the program that initially used a data value, without revealing the actual data value to the software developers. This protects the user's privacy when the data value was characteristic of personal information.

Some methods for generating, sending and receiving a triage dump may be executed by a processor of a computing system executing instructions stored on a computer readable storage device.

The foregoing is a non-limiting summary of the invention, which is defined by the attached claims.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

The inventors have recognized and appreciated that improved techniques for collecting memory dumps as part of an error reporting system can provide significant additional information for diagnosing errors without increasing the risk to a user's privacy and personal information. To protect privacy, certain data values of memory dumps sent by an error reporting system may need to be poisoned if they are characteristic of personal information. "Poisoning" may comprise overwriting data values with overwrite values. Poisoning personal data, such as a password or credit card information, is unlikely to affect the software developers ability to analyze the memory dump data because personal information is rarely relevant to the analysis. Conventional error reporting systems, particularly when configured to form a triage dump, may poison any values characteristic of personal information.

However, the inventors have further recognized that it is useful for a memory dump to be poisoned with values that do not obscure other information that is retained. Accordingly, the overwrite values may be selected to be different than any value retained. As a specific example, the overwrite value may be selected to distinguish between null pointer values and poisoned data values. Thus, in some embodiments, the null pointer value is not used as an overwrite value to poison data values. Though, in other embodiments, an overwrite value may be selected such that it is different from any value that is, or is likely to be, a meaningful value of a pointer or other type of data for which values are retained.

The inventors have further recognized that it is useful for a memory dump to be poisoned in a way that retains information about the values that are overwritten, even if those values cannot be recovered from the memory dump. Accordingly, the overwrite value may be selected based in part on the value that is overwritten. However, the selection may be made is such a way that the value overwritten is not recoverable from the overwrite value. In some embodiments, the value that is over written may not be recoverable because of a many to one relationship between values overwritten and an overwrite value. Such a scenario, may occur, for example, when overwrite values are associated with respective ranges of values and the same value is used to overwrite any value in a respective range. As a specific example, different overwrite values may be used to identify large negative numbers, large positive numbers, and other values. Such an over write value assignment scheme, for example, may all analysis of a crash dump to identify values that are indicative of overrun or under run errors.

In some embodiments, the value that is overwritten may not be recoverable because of a random relationship between values overwritten and the overwrite values. Such a scenario may occur when a random mapping between values and overwrite values is created. Such a mapping may be useful in identifying multiple instances of the same value in the memory dump and, for example, may be used to trace a particular variable passed through functions on the call stack, without revealing the value of that variable.

In scenarios in which an overwrite value is dynamically determined, a selected overwrite value or values may be communicated as part of or in conjunction with an error report to facilitate analysis of the error report. For example, the set of randomly selected values in a random map, without the associated values that they overwrite, may be communicated.

Figure 1:
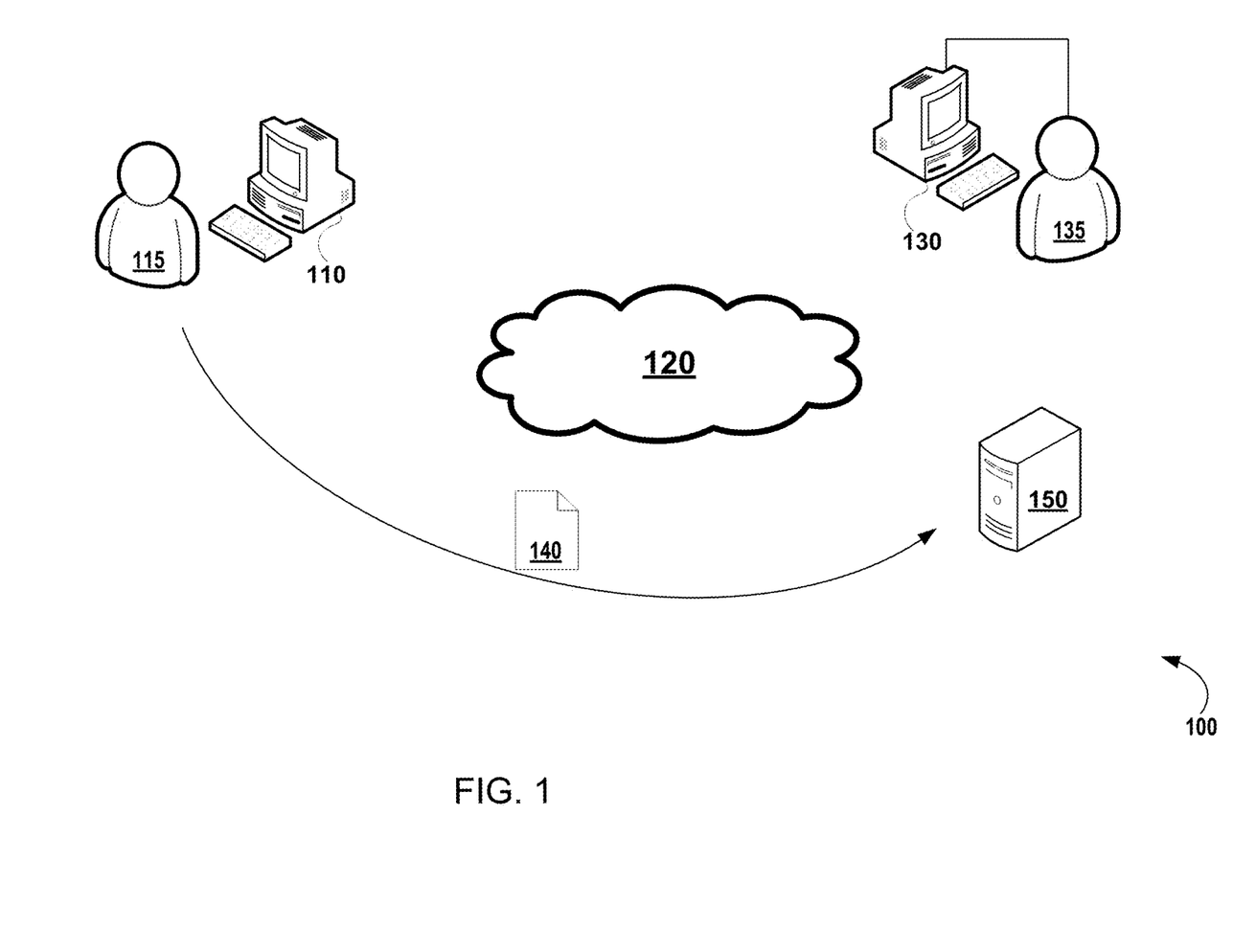
FIG. 1 is a simplified block diagram of an exemplary network environment in which a triage dump may be sent to a software developer.

FIG. 1 illustrates an exemplary network environment 100 where triage dumps may be sent from a software user 115 to the software developer 135. A computer system 110 associated with the software user 115 may execute a program that crashes or hangs. The program may be any type of computer program. For example, it may be an application program or an operating system program. In some cases, it may be a program associated with the kernel of the operating system. Though, the specific components about which error information is collected is not critical to the invention.

The type of errors for which information is collected also is not critical to the invention. For example, a crash refers to a program unexpectedly terminating. If an error in a program disrupts a critical component of the kernel, then a program crash may cause the entire computer system 110 to crash. A hang, on the other hand, is when a program continues to run, but fails to respond to user input and appears to freeze. The terms "hang" and "freeze" are sometimes used interchangeably. Error information may be collected in response to crashes, hangs and any other suitable type of error. These errors may be detected in any suitable way, including using techniques as are known in the art. In some embodiments, errors that cause information to be collected may be any unexpected or unintended result. For example, an error may occur when a program encounters performance issues or does not respond appropriately.

Program crashes and hangs may occur for a variety of reasons. For example, an improper data value that has not been accounted for by the developer may result in a crash or a hang. Passing a null pointer, for example, may cause a crash. Wrap around errors, wherein a value surpasses the maximum value allowed for its variable type and is interpreted as a negative value, may be the cause of a crash or a hang. Embodiments of the invention are not limited to any particular reason for a crash or hang.

When a program crashes or hangs, the computer system 110 may initiate the generation of a triage dump 140. The triage dump 140 is a dump of a small portion of the memory of the computer system 110 that may be used by the software developer 135 to analyze the cause of the crash or hang. The specific portion of the memory dumped may include memory used to hold a call stack. The triage dump 140 may be, for example, less than 50 KB in size. In some embodiments triage dump 140 may be 10-20 KB. The specific portions of the memory included in a triage dump may be selected in any suitable way, including using techniques as are known in the art and may be of any suitable size.

A small triage dump size allows the triage dump 140 to be sent over the network 120 quickly and easily. Computer network 120 may be any type of network. In some embodiments, network 120 is the Internet.

The triage dump may be received at any suitable location, which in this example is a server 150 connected to network 120. Server 150 may be configured to receive triage dumps from a plurality of users. This information may be aggregated and processed to identify one or more possible problems with a component that may be executing on computer 110 and other similar computers that similarly report errors. When the error is associated with a particular software component, error information may be provided to a developer of that component.

Accordingly, software developer 135 may receive from server 150 an indication of an error. The software developer 135 may use computer 130 to access the data stored in server 150 to investigate the source of the error. The software developer 135, for example, may analyze one or more triage dumps 140 sent by one or more users 115 of the software to identify the cause of the crash or hang that resulted in the generation of triage dump 140.

In some embodiments, the software developer 135 may determine that there is a problem with the software that requires further information and a more detailed analysis. The software developer 135 may notify user's computer 110 that if a similar crash or hang occurs, the computer 110 may ask the user 115 for permission to send a more detailed memory dump to the software developer 135. For example, the user 115 may be asked for permission to send a larger memory dump that may contain personal information. If the user declines, then the larger memory dump is not sent. Embodiments of the invention are not limited to any particular implementation of a triage dump 140 or larger memory dump.

Figure 2:
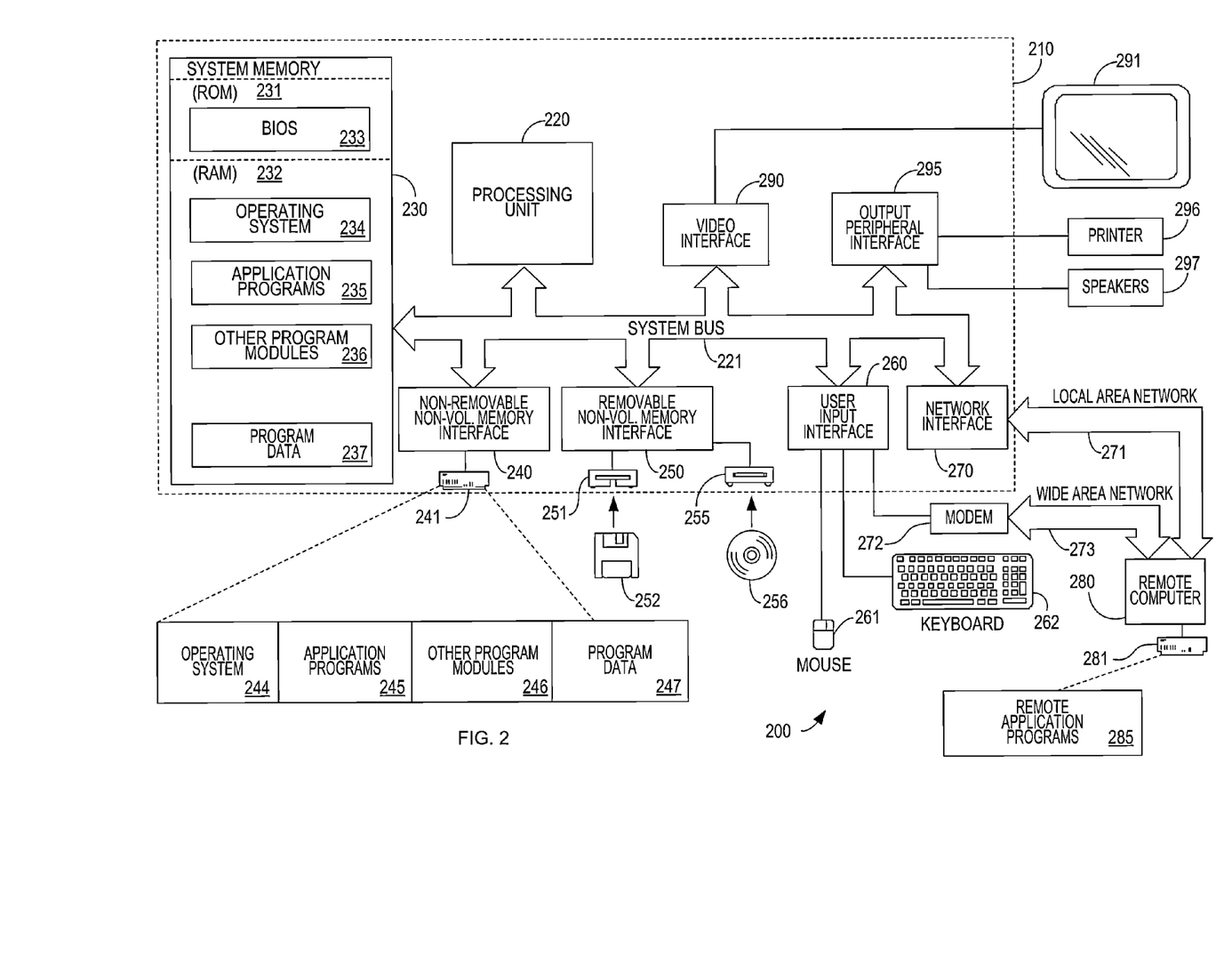
FIG. 2 is a block diagram of an exemplary computing environment in which embodiments of the invention may operate.

FIG. 2 illustrates an example of a suitable computing system environment 200 on which the invention may be implemented. For example, computing environment 200 includes a computer 210 which may be the user's computer 110, the software developer's computer 130 or the server 150 of the error reporting system.

The computing system environment 200 is only one example of a suitable computing environment and is not intended to suggest any limitation as to the scope of use or functionality of the invention. Neither should the computing environment 200 be interpreted as having any dependency or requirement relating to any one or combination of components illustrated in the exemplary operating environment 200.

The invention is operational with numerous other general purpose or special purpose computing system environments or configurations. Examples of well-known computing systems, environments, and/or configurations that may be suitable for use with the invention include, but are not limited to, personal computers, server computers, hand-held or laptop devices, tablets, mobile phones, multiprocessor systems, microprocessor-based systems, set top boxes, programmable consumer electronics, network PCs, minicomputers, mainframe computers, distributed computing environments that include any of the above systems or devices, and the like.

The computing environment may execute computer-executable instructions, such as program modules. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 2, an exemplary system for implementing the invention includes a general purpose computing device in the form of a computer 210. Components of computer 210 may include, but are not limited to, a processing unit 220, a system memory 230, and a system bus 221 that couples various system components including the system memory to the processing unit 220. The system bus 221 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. An exemplary system may also be implemented using System on a Chip (SoC).

Computer 210 typically includes a variety of computer readable media. Computer readable media can be any available media that can be accessed by computer 210 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 210. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 230 includes computer storage media in the form of volatile and/or nonvolatile memory such as read only memory (ROM) 231 and random access memory (RAM) 232. The triage dump 140 may comprise data stored in either ROM 231 or RAM 232, or both. A basic input/output system 233 (BIOS), containing the basic routines that help to transfer information between elements within computer 210, such as during start-up, is typically stored in ROM 231. RAM 232 typically contains data and/or program modules that are immediately accessible to and/or presently being operated on by processing unit 220. By way of example, and not limitation, FIG. 2 illustrates operating system 234, application programs 235, other program modules 236, and program data 237, any of which may crash or hang and result in the computer 210 generating a triage dump. Further aspects of the operating system (OS) 234 will be discussed in connection with FIG. 3.

The computer 210 may also include other removable/non-removable, volatile/nonvolatile computer storage media. By way of example only, FIG. 2 illustrates a hard disk drive 241 that reads from or writes to non-removable, nonvolatile magnetic media, a magnetic disk drive 251 that reads from or writes to a removable, nonvolatile magnetic disk 252, and an optical disk drive 255 that reads from or writes to a removable, nonvolatile optical disk 256 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 241 is typically connected to the system bus 221 through an non-removable memory interface such as interface 240, and magnetic disk drive 251 and optical disk drive 255 are typically connected to the system bus 221 by a removable memory interface, such as interface 250.

The drives and their associated computer storage media discussed above and illustrated in FIG. 2, provide storage of computer readable instructions, data structures, program modules and other data for the computer 210. In FIG. 2, for example, hard disk drive 241 is illustrated as storing operating system 244, application programs 245, other program modules 246, and program data 247. Note that these components can either be the same as or different from operating system 234, application programs 235, other program modules 236, and program data 237. Operating system 244, application programs 245, other program modules 246, and program data 247 are given different numbers here to illustrate that, at a minimum, they are different copies. A user may enter commands and information into the computer 210 through input devices such as a keyboard 262 and pointing device 261, commonly referred to as a mouse, trackball or touch pad. Other input devices (not shown) may include a microphone, joystick, game pad, satellite dish, scanner, or the like. These and other input devices are often connected to the processing unit 220 through a user input interface 260 that is coupled to the system bus, but may be connected by other interface and bus structures, such as a parallel port, game port or a universal serial bus (USB). A monitor 291 or other type of display device is also connected to the system bus 221 via an interface, such as a video interface 290. In addition to the monitor, computers may also include other peripheral output devices such as speakers 297 and printer 296, which may be connected through a output peripheral interface 295.

The computer 210 may operate in a networked environment using logical connections to one or more remote computers, such as a remote computer 280. The remote computer 280 may be a personal computer, a server, a router, a network PC, a peer device or other common network node, and typically includes many or all of the elements described above relative to the computer 210, although only a memory storage device 281 has been illustrated in FIG. 2. The logical connections depicted in FIG. 2 include a local area network (LAN) 271 and a wide area network (WAN) 273, but may also include other networks. Such networking environments are commonplace in offices, enterprise-wide computer networks, intranets and the Internet. As depicted in FIG. 1, the remote computer 280 may be the software developer's computer 130 or server 150.

When used in a LAN networking environment, the computer 210 is connected to the LAN 271 through a network interface or adapter 270. When used in a WAN networking environment, the computer 210 typically includes a modem 272 or other means for establishing communications over the WAN 273, such as the Internet. The modem 272, which may be internal or external, may be connected to the system bus 221 via the user input interface 260, or other appropriate mechanism. In a networked environment, program modules depicted relative to the computer 210, or portions thereof, may be stored in the remote memory storage device. By way of example, and not limitation, FIG. 2 illustrates remote application programs 285 as residing on memory device 281. It will be appreciated that the network connections shown are exemplary and other means of establishing a communications link between the computers may be used.

Figure 3:
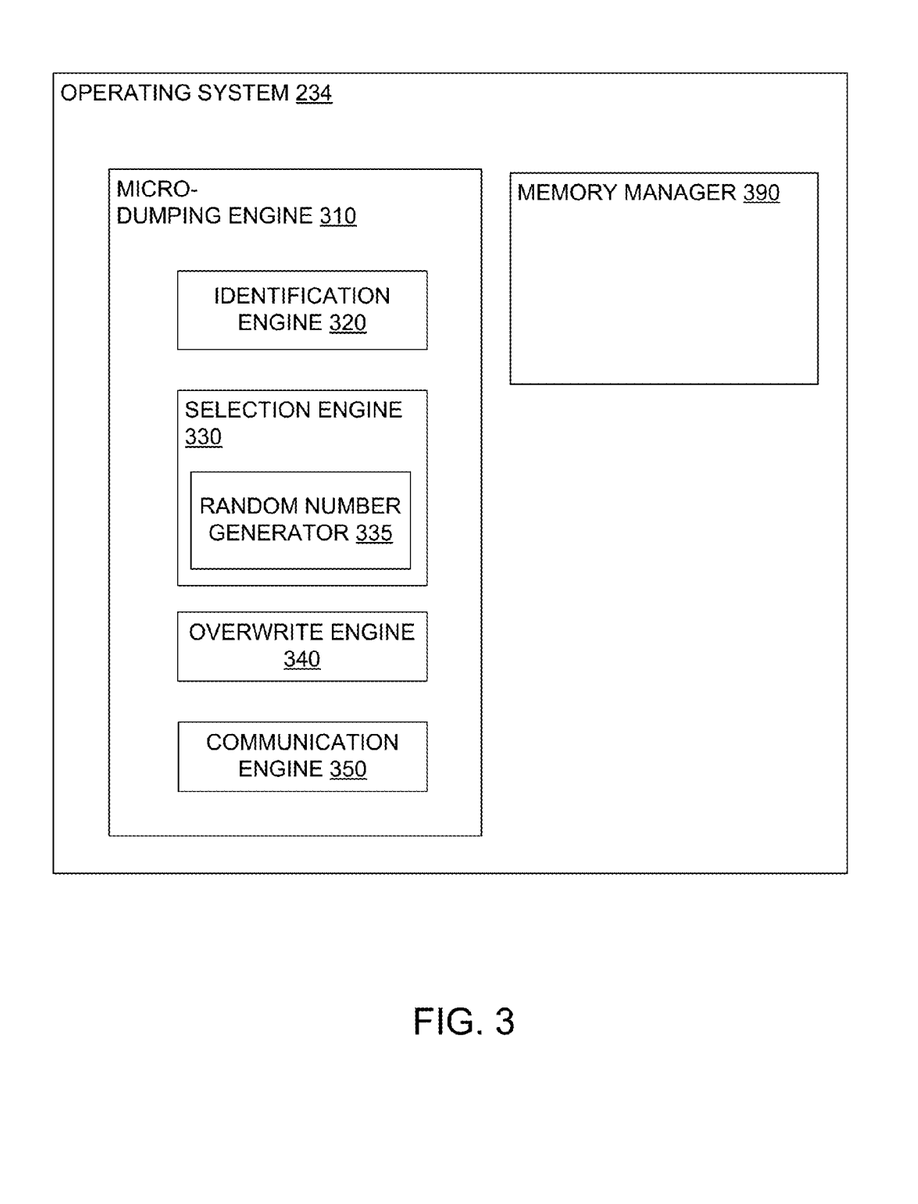
FIG. 3 is a simplified block diagram of the operating system of FIG. 2.

FIG. 3 illustrates some components of operating system (OS) 234 which may be used in some embodiments of an error reporting system. For example, an operating system (OS) 234 may have a memory manager 390, which may control how software, such as application programs 235, interact with and utilize RAM 232. The memory manager 390 may control which portions of the RAM 232 are allocated to a given application program 235. The OS 234 may also have a triage dumping engine 310 for generating triage dumps. In some embodiments, the triage dumping engine 310 may be part of the memory manager 390.

In some embodiments, the triage dumping engine 310 initiates the generation of the triage dump based on a problem encountered during execution of one or more software programs executing on processing unit 220. Embodiments of the invention are not limited to any particular type of problem. For example, a problem with a program may by a program crash, where the program unexpectedly terminates execution. In some embodiments, the problem may be a program hang, where the program continues execution but stops responding to commands from the user 115. Some embodiments may initiate the generation of a triage dump based on problems of less severity than a crash or a hang. For example, a program running on the computer 210, such as a component of the OS 234, an application program 235, or another program module 236, may instruct the triage dumping engine 310 to initiate the dump based on any pre-programmed condition.

The triage dumping engine 310 may comprise an identification engine 320 for identifying data values in memory of the system that are characteristic of personal information and, therefore, should be poisoned. It may be difficult to be certain as to whether a data value is personal information or data with no privacy concerns. This is because, in some embodiments, little to no processing of the memory dump is performed. Analyzing the memory dump on the user's computer 110 may require significant resources and result in reduced performance. Therefore, processing and analysis is offloaded to the software developer's computer 130. Offloading the processing of the memory dump data, however, results in the user's computer 110 seeing essentially a string of numbers with very little context. From this string of numbers, the identification engine 320 may not be able to ascertain with certainty that a particular data value is personal information. However, the identification engine 320 may be able to determine that a particular data value has characteristics of personal information. Any suitable criteria may be used to define characteristics of personal information. In some embodiments, personal information may be characterized by values that are other than values likely not to be of another identifiable type. For example, in some embodiments, values that are likely pointers may be identified based on whether they are within a range of memory addresses to which a pointer can validly point. Other values may be treated as characterizing personal information. However, some embodiments for identifying data values that are characteristic of personal information will be described in connection with FIG. 4, which illustrates an example memory 400 of a computer 110.

Figure 4:
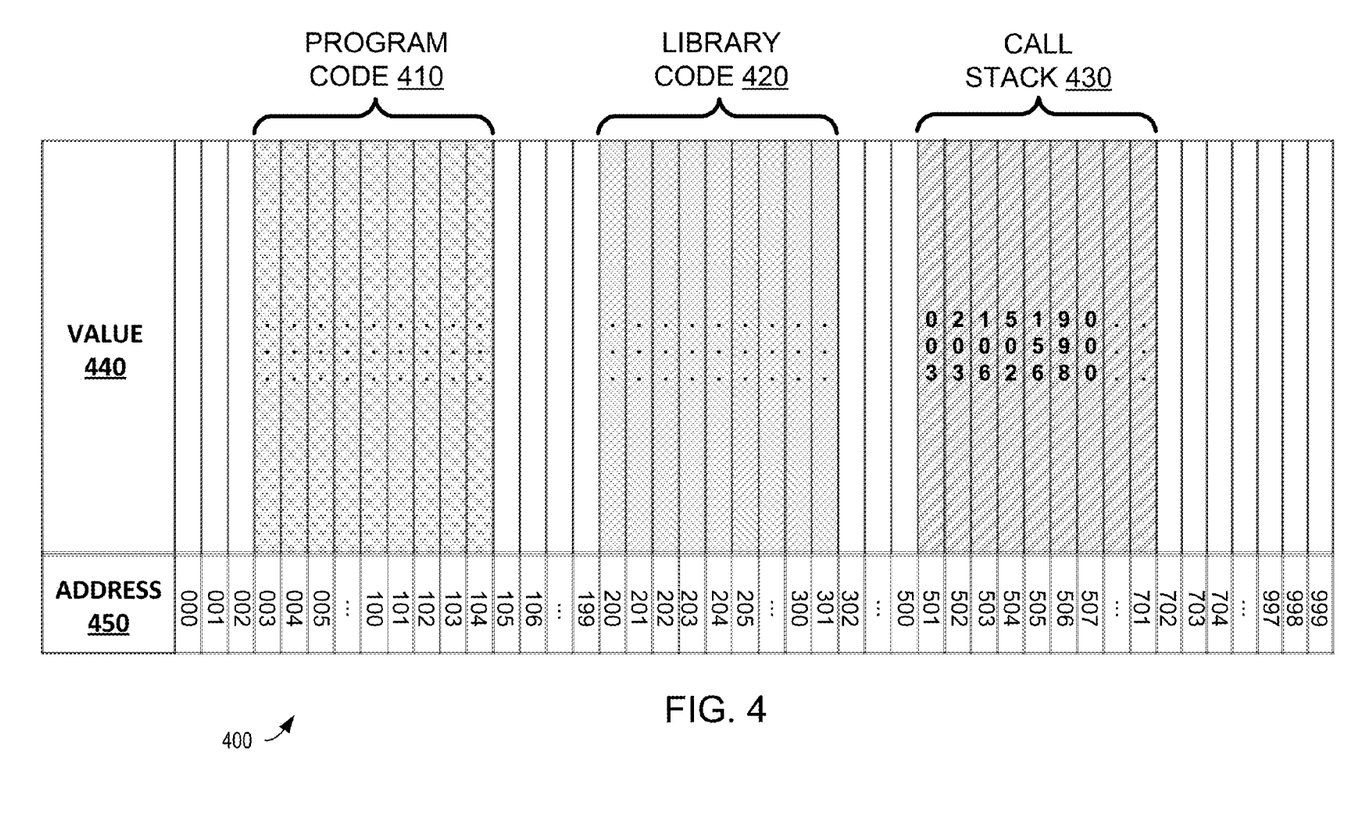
FIG. 4 is a schematic illustration of an exemplary memory of a computer system that may implement embodiments of the present invention.

In some embodiments, the memory 400 comprises a plurality of memory locations, each associated with an address 450 and a data value 440. Only a portion of the memory locations are illustrated in FIG. 4 and implementation of the memory is simplified to simplify the illustration. For example, each memory location is associated with an address in the range 000 to 999. One of skill in the art would recognize that there may be a far greater number of memory locations in an actual memory 400 and that the memory locations could be addressed in any suitable way. For example, the memory locations may have an address that is a 32 bit or a 64 bit address. One of skill in the art would also recognize that the memory 400 could be a virtual memory implemented by the memory manager 390 of OS 234.

For illustrative purposes, FIG. 4 shows the data values 440 held in each memory location as a decimal integer in the range 000 to 999. However, embodiments of the invention are not so limited and the data values 440 may be implemented in any suitable way, with any suitable range of values. For example, the data values 440 could be a 32 bit or 64 bit address. In some embodiments, the size of the data value 440, sometimes referred to as the "word size," is the same as the size of the memory location address 450.

For simplicity, not all data values 440 are shown for every memory location. However, a portion of data values 440 are shown in the memory locations with addresses 500 to 507. For example, the memory location with address 502 holds the data value 203.

The memory locations of memory 400 that are dumped may be restricted in size to reduce the size of the triage dump. The restriction on which memory locations are dumped may be implemented in any way and embodiments of the invention are not limited to any particular technique. For example, in some embodiments only the memory associated with a program that crashed or hung is dumped. In some embodiments, the triage dump may be restricted to the portion of memory 400 that holds the call stack 430 of the program or only the portion of the call stack that holds data for the program that encountered a problem resulting in initiating the generation of the triage dump. Though, the amount of memory dumped and the manner in which it is selected is not critical to the invention, and may be determined using techniques as are known in the art, or in any other suitable way.

Regardless of the amount of memory dumped to create the triage dump, values characterized as personal information may be identified by the identification engine 320. In some embodiments, the identification engine 320 may identify data values 440 that have a characteristic of a pointer. Data values that are pointers are useful in the process of analyzing the triage dump. Therefore, data values 440 characteristic of a pointer should not be poisoned by the triage dumping engine 310. As mentioned above, the user's computer 110 does not perform a thorough analysis of the memory dump so it only sees the dump as a string of integers with very little context. Thus, the identification engine 320 cannot identify with certainty that a particular data value is a pointer, but it may determine that the particular data value is characteristic of a pointer.

Determining that a data value is characteristic of a pointer may be done in any suitable way. For example, the data value may be treated as if it were a pointer and the memory location that the data value points to may be investigated. For example, if the data value points to a memory location that is associated with program code 410, library code 420, or the call stack 430, then the data value may be maintained and not overwritten. In some embodiments, if the data value points to a memory location that is associated with program code, library code or a call stack the data value may be maintained and not overwritten. In some embodiments, relevant data alternatively or additionally may comprise another type of pointer, such as a handle to a kernel-mode object or heap data. Not all data values that are kept using this technique need definitely be pointers, but whether a memory location holds a pointer can be determined with an acceptable level of certainty. Though, it should be appreciated that in other embodiments other techniques may be used, possibly to perform a more thorough analysis of the dump data, to determine values that are to be retained in the triage dump and, conversely, which are to be overwritten.

In some embodiments, it variables that are known not to be personal information may be left unpoisoned. For example, global variables and/or dynamically generated modules may be useful in analyzing the triage dump, but are unlikely to contain personal data.

As an example, FIG. 4 shows the data value in the memory location with the address 501 is "003." If this value is a pointer, it points to the memory location with the address 003. The memory location with the address 003 is associated with the program code 410. Therefore, the identification engine may identify the memory location with the address 501 as being characteristic of a pointer.

The data value in the memory location with the address 502 is "203." If this value is a pointer, it points to the memory location with the address 203. The memory location with the address 203 is associated with the library code 420. Therefore, the identification engine would identify the memory location with the address 502 as being characteristic of a pointer.

The data value in the memory location with the address 504 is "502." If this value is a pointer, it points to the memory location with the address 502. The memory location with the address 502 is associated with the call stack 430. Therefore, the identification engine would identify the memory location with the address 502 as being characteristic of a pointer.

On the other hand, the data value in the memory location with the address 505 is "156." If this value is a pointer, it points to the memory location with the address 156. The memory location with the address 156 is not associated with a memory location that is of interest to the software developer 135. Therefore, the identification engine would not identify the memory location with the address 502 as being characteristic of a pointer.

In some embodiments, a memory location not being characteristic of a pointer may be interpreted as the memory location being characteristic of personal information. Therefore, the identification engine may identify the memory location with the address 505 as personal information, which may be poisoned.

In some embodiments, triage dumping engine 310 comprises a selection engine 330 for selecting overwrite values with which to poison the data values determined to be characteristic of personal information by the identification engine 320. The selection engine may select overwrite values in any suitable way. In some embodiments, the single overwrite value may be used for every data value. For example, in the simplified memory 400 of FIG. 4, each of the data values identified as being characteristic of personal information may be overwritten with the overwrite value 999. Such an overwrite value may be selected because, in this specific example, it does not correspond to a value for a pointer or the value of a null pointer.

Figure 5A:
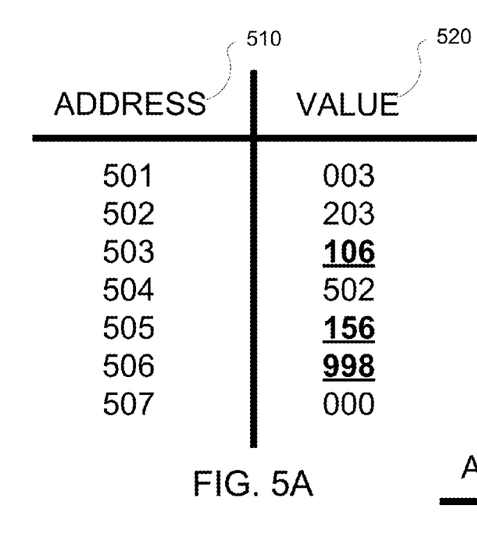
FIG. 5A illustrates the exemplary memory of FIG. 4 in a table.
Figure 5B:
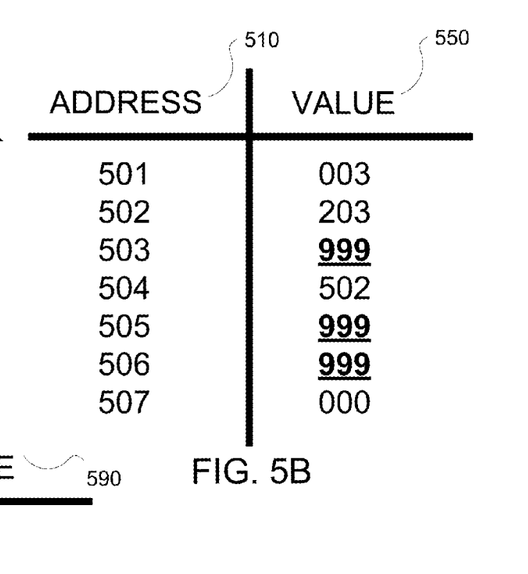
FIG. 5B illustrates the exemplary memory of FIG. 4 after poisoning data values that may have contained personal information according to one embodiment of the invention.

FIG. 5A illustrates, as a table 500, the memory addresses 510 and data values 520 associated with memory locations with addresses 501-507 of FIG. 4. The data values for the memory locations with addresses 503, 505 and 506 are underlined to show that they are the data values identified by the identification engine to be characteristic of personal information. FIG. 5B illustrates a table 530 in which the data values 550 have values as would appear in the triage dump if the data values characteristic of personal information were poisoned with the single overwrite value "999."

One of skill in the art would appreciate that any overwrite value could be used. In some embodiments, the overwrite value can be anything other than the null pointer value. The "null pointer value" is the value that the computer system 210 uses to indicate absence of data. The null pointer value may be any value determined by the computer system and is not limited to any particular numeric quantity. For example, in the example of FIG. 4 and FIG. 5A, the memory location with address 507 contains the value 000. In this example, 000 is the null pointer value. Therefore, the overwrite value used to poison other data values may not be the 000. Restricting the allow the software developer 135 to identify data values that were originally null pointer values from poisoned data values.

One of skill in the art would recognize that embodiments of the invention may use data values that are 32 bit words or 64 bit words, which may be represented by hexadecimal values with 8 or 16 hexadecimal digits, respectively. For example, in a 32-bit system, all 32 bits being "1" would be represented by the hexadecimal number 0xFFFFFFFF. In some embodiments, the overwrite value of for every data value to be poisoned may be the same hexadecimal number. For example, 0xCCCCCCCC may be the predetermined overwrite value to use for all poisoning.

Figure 5C:
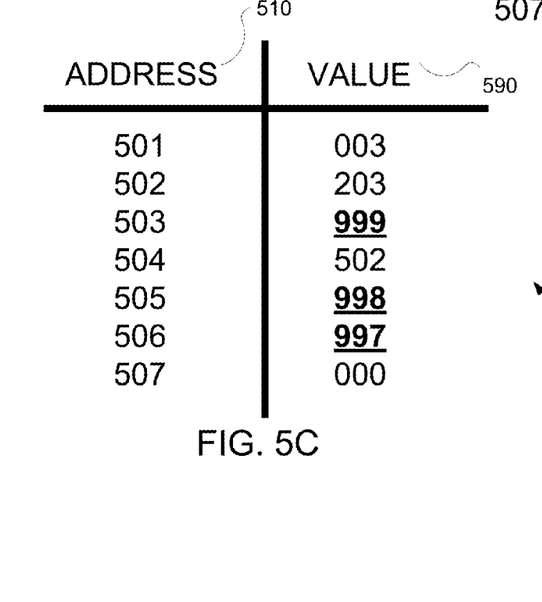
FIG. 5C illustrates the exemplary memory of FIG. 4 after poisoning data values that may have contained personal information according to one embodiment of the invention.

In some embodiments, the selected overwrite value may be a function of the data value being overwritten. In this way, more information may be conveyed to the software developer 135 without sending any personal information. For example, all the data values within a first range may be overwritten with a first overwrite value, while all data values within a second range may be overwritten with a second overwrite value. An embodiment that uses this technique is illustrated by table 570 in FIG. 5C. In this example, data values within the range 1-149 that are to be poisoned are overwritten with the overwrite value 999, data values within the range 150-299 that are to be poisoned are overwritten with the overwrite value 998, and data values within the range 850-999 that are to be poisoned are overwritten with the overwrite value 997. These overwritten values 590 are shown in table 570.

In some embodiments, it may aid the analysis performed by the software developer 135 if data values representing negative numbers, or large negative numbers, are poisoned with a particular value. This could help identify wrap around errors in the software. The specific criteria used to identify a large negative number may depend on word size and other factors. Though, as an example, large negative numbers, which are to be associated with a specific overwrite value, may be identified as those having a magnitude above a threshold. That threshold may be selected in any suitable way. Though, as specific examples, the threshold may be selected to be within 15% or, in some embodiments, within 10%, of the largest negative number that the computer system can represent. A similar technique may be used to identify a large positive value and associate a different overwrite value with large positive values.

In some embodiments, the selected overwrite value may be a function of the memory protection options associated with the memory location. For example, memory locations may be stored in memory pages that are read-only, execute-only, execute and read, or any other memory protection option. As one example, a 32-bit system may use the overwrite value 0x00000010 to poison every data value that is determined to be personal information stored in read-only memory. The same system may use the overwrite value 0x00000020 to poison every data value that is determined to be personal information stored in execute-only memory and the number of memory locations that have their data values dumped is restricted to a small portion of the total memory.

In some embodiments, the selection engine may use a random number generator 335 to generate overwrite values at run-time. One of skill in the art would understand that random number generator 335 could be implemented in any suitable way using techniques as are known in the art. For example, random number generator 335 could be a component of the selection engine 330 or could be a component of the OS 234 that is called by the selection engine to provide a random number. One of skill in the art would also understand that a random number generator 335 may be a pseudo-random number generator or any component that provides a pseudo-random result.

In some embodiments, a different random value is selected for each data value that is poisoned. It may also be useful to restrict the random values to a particular range of values. For example, in the example of FIG. 4, the overwrite values could be restricted to the range 900-999. Thus, for each data value to be poisoned, the selection engine 330 randomly generates a value within the specified range to use as an overwrite value. This allows some embodiments to ensure that the overwrite values do not match any of the data values that are not poisoned in the triage dump generation process. Ensuring that overwrite values do not match any of the data values in the triage dump that are unpoisoned may be done in any suitable way. For example, the values from the random number generator may be filtered to avoid collision with any of the unpoisoned triage dump values.

More information may be provided to the software developer 135 by using the same random overwrite value for each instance of the same data value. For example, information generated in this way may help the software developer 135 track a piece of data through the call stack and identify a problem at the source. The same random overwrite value may be selected by keeping track of data values that have been poisoned and the random overwrite values with which the data values were overwritten. This information may be mapped in any suitable way. For example, the data values and random overwrite may be stored in a table. Thus, when the selection engine 330 encounters a next data value to poison, the selection engine first checks the table to determine if the data value was previously poisoned. If it has, then the same random overwrite value indicated in the table is used to poison the next data value. If not, a new random data value is selected and is added to the table. The privacy of the user 115 is still maintained in this method, because it is only the user's computer 110 that has the full mapping information. When the triage dump is sent to the external server 150, only the overwrite values are sent, not the original data values. Thus, the software developer 135 is made aware of which values of the triage dump were poisoned without revealing any of the user's personal information.

Triage dumping engine 310 may comprise an overwrite engine 340 for performing the actual overwriting of the data values determined to be characteristic of personal information with the overwrite values selected by the selection engine 330. Overwriting data values may be performed in any suitable way. For example, the data value may be dumped to a separate file first and then overwritten within the file. Though, other approaches may be used. In some embodiments, for example, the overwriting may occur directly in the memory 400 or as data values are being copied to a file. As mentioned above, it may be useful to maintain data values that have the same value as the null pointer value. Thus, even if the null pointer value is not otherwise treated as meeting the characteristics of a pointer, as defined by the computer OS 234, then the null pointer value may be retained. For example, in a 32 bit system, the null pointer value may be 0x00000000.

Triage dumping engine 310 may comprise a communication engine 350 for sending the triage dump to a location outside of the computer system 110. The communication engine may operate in any suitable way. For example, the communication engine may send the triage dump to an external server 150 using error reporting techniques as are known in the art. The server 150 may be associated with a software developer 135.

Figure 6:
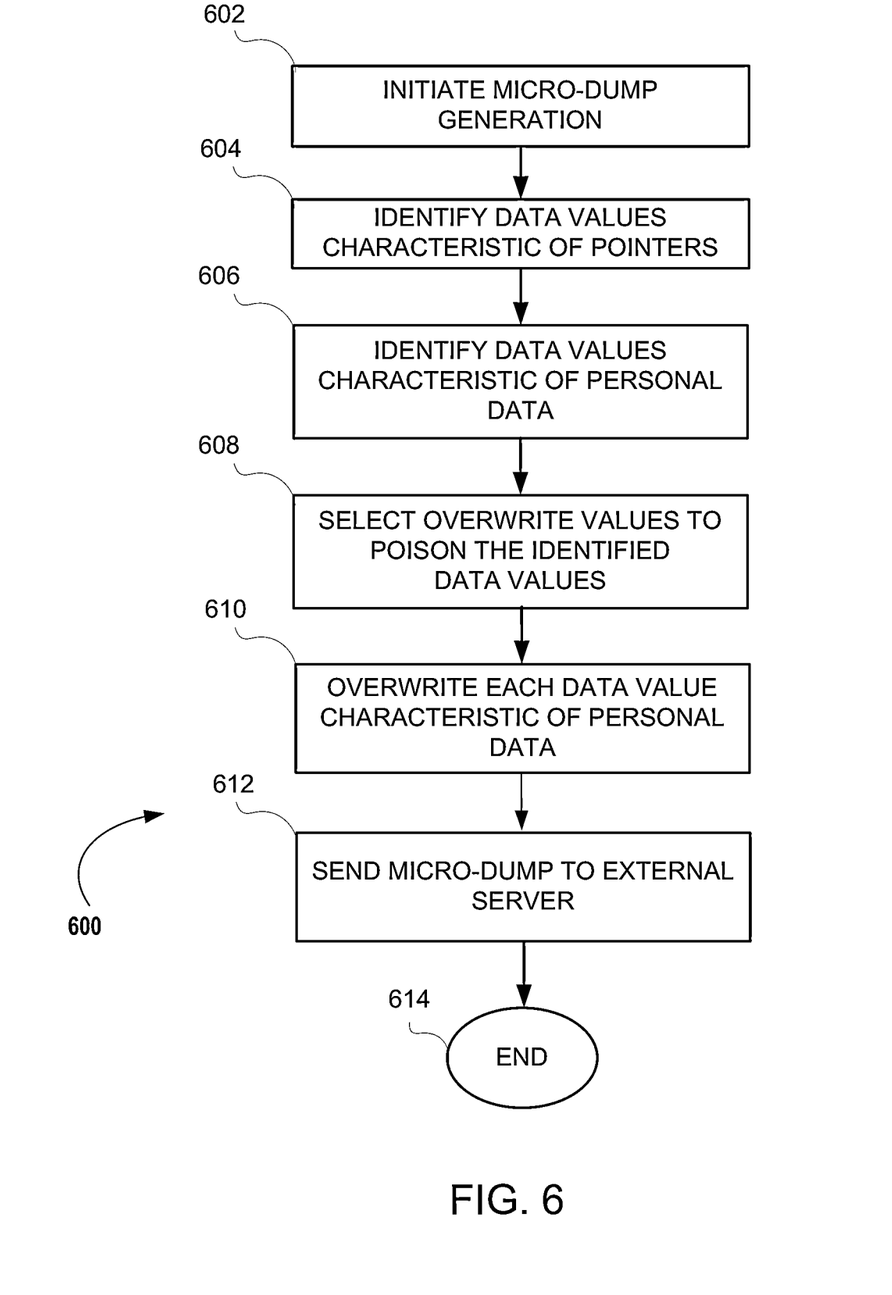
FIG. 6 illustrates a schematic flow diagram of one embodiment for generating a triage dump.

Turning to FIG. 6, a flow chart of embodiment method for generating a triage dump is illustrated. This method may be performed by Triage dumping engine 310, or any other suitable component. The method 600 begins at 602 by initiating the generation of a triage dump. Generation of a triage dump may be initiated in any suitable way. In some embodiments, initiation is a response to some condition that occurs in the computer system 110. For example, the condition may be some sort of problem with the software executing on processing unit 220. The problem may be a program crashing or hanging. Such a condition may be detected using techniques as are known in the art. However, embodiments of the invention are not limited to any particular initiation step.

The method 600 may continue at act 604, where the identification engine identifies data values stored in memory that are to be retained. In this example, the values are identified based on whether they have characteristic of pointers. Data values that are pointers are useful for later analysis of the triage dump and so may not poisoned in this example. Any suitable method of identification may be used. For example, the aforementioned technique of testing where the data value would point if it were a pointer may be used. In some embodiments, if the data value, if interpreted as a pointer, points to a portion of memory determined to be relevant to the current state of the software program that initiated the triage dump generation, then the data value may be identified as characteristic of a pointer. Relevant data values may be data associated with the program code, library code or call stack. In some embodiments, relevant data may comprise another pointer, a handle to a kernel-mode object or heap data.

The method 600 may continue at act 606, where the identification engine 320 identifies data values stored in memory that are characteristic of personal data. Data values that are personal information are unlikely to be useful for later analysis and may be poisoned to ensure the privacy of the user. Any suitable method of identification may be used. For example, data values that are not identified as characteristic of pointer in act 604, or that are not otherwise identified to be retained, may be identified as characteristic of personal data.

The method 600 may continue at act 608, where the selection engine 330 overwrite values are selected with which the identified data values will be poisoned. Any suitable method of selecting overwrite values may be used. For example, any of the above techniques for selecting overwrite values. In some embodiments, the same overwrite value may be used for all data values. In other embodiments, the overwrite value may be based on the data value being overwritten. In some embodiments, the overwrite values are selected at random using a random number generator.

The method 600 may continue at act 610, where the overwriting engine 340 overwrites each data value that is identified as being characteristic of personal data with the overwrite value selected in act 608. Any suitable method of overwriting may be used. For example, as mentioned above, the overwriting may occur in a separate triage dump file or in the memory 400 itself.

The method 600 may continue at act 612, where the communication engine sends the generated triage dump to an external server. Any suitable method of sending may be used. For example, as mentioned above, the triage dump may be sent over computer network 120. In some embodiments, the triage dump may be placed on a disk and delivered to the developer in any suitable way. In other examples, the triage dump may be generated on the computer used by the software developer and can, therefore, be stored directly on the same computer on which the triage dump was generated. The method 600 terminates at act 614, after the triage dump is sent to the software developer.

It should be appreciated that FIG. 6 is an example of a method that may be used to generate a triage dump file, but that other methods may be used. Another exemplary method 700 for generating a triage dump is illustrated in the flow chart of FIG. 7. At act 702, the identification engine may determine a data value to overwrite. As above, this act 702 may be implemented in any suitable way.

Figure 7:
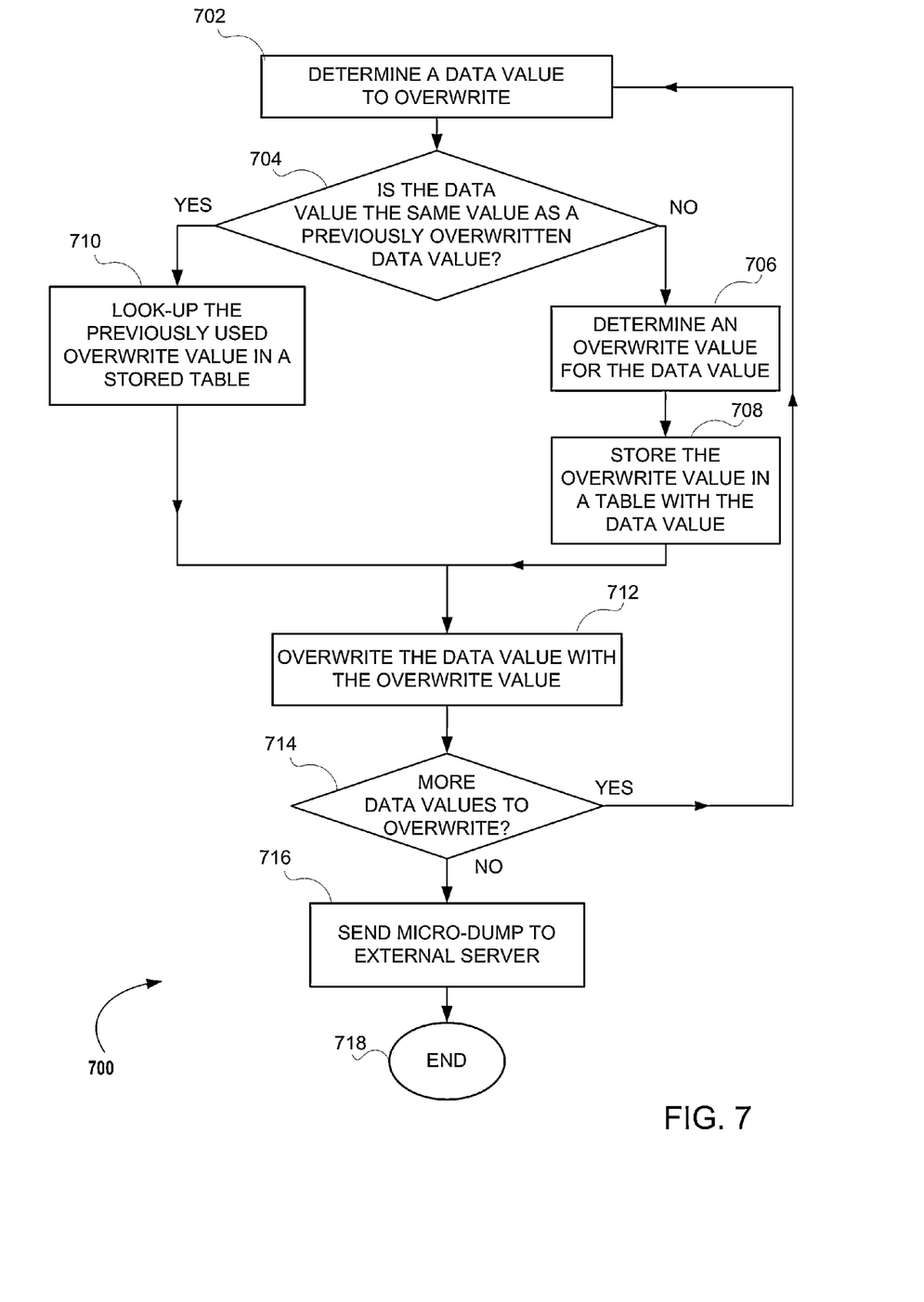
FIG. 7 illustrates a schematic flow diagram of one embodiment for generating a triage dump using a random number generator.

The method 700 may continue at act 704, where the identified data value is compared against previously overwritten data values. If the identified data value has not previously been poisoned, then an overwrite value is determined for the data value at act 706. This determination 706 may be implemented in any suitable way. For example, a random number generator may be used to generate a random overwrite value. In some embodiments, the random overwrite value may be restricted to fall within a predetermined range of values and/or may be restricted in other ways, such as to ensure that each overwrite values correspond to only one value to be overwritten.

Once the overwrite value is determined at act 706, method 700 may continue at act 708 where the determined overwrite value is stored in a table along with the data value so that the triage dumping engine 310 may look-up the data value in subsequent iterations of implementing act 704, as described below.

If, at act 704, it is determined that the data value has previously been poisoned by the triage dumping engine 310, the method 700 continues at act 710 where the previously used overwrite value for that particular data value is looked-up in a table stored in the computer's memory and maintained by the triage dumping engine 310.

After either of act 708, wherein the data value was not previously poisoned, or act 710, wherein the data value was previously poisoned, the method 700 continues at act 712. At act 712, the overwrite engine 340 overwrites the data value with the determined overwrite value, whether it was determined from the table in act 710 or by generating a new overwrite value in act 706.

The method 700 continues at act 714, where it is determined whether more data values are in need of poisoning. If it is determined that there are more data values that need overwriting before the generation of the triage dump is complete, then the method 700 returns to act 702 to perform an additional iteration of the aforementioned acts. If it is determined, at act 714, that there are no more data values in need of poisoning, then the method continues to act 716, where the generated triage dump is sent to an external server for analysis by the software developer. The method terminates thereafter at act 718.

Embodiments of the above methods, described in connection with FIG. 6 and FIG. 7, are not limited to performing each and every act described therein. Nor must every act of the methods be performed in the precise order described above. For example, some embodiments may identify data values characteristic of pointers prior at act 604 after identifying data values characteristic of personal data in act 606. In other embodiments, the act 604 of identify data values characteristic of pointers may not be performed at all. One of ordinary skill in the art would understand that the foregoing embodiments are but particular examples of methods employing aspects of the invention.

It should also be noted that the purpose of poisoning data values, as described above, is not to reduce the size of the triage dump, but preserves the privacy of the software user. The poisoning of the triage dump may, however, reduce the size of the triage dump if compression is used. The triage dump may be compressed in any suitable way, as known in the art.

Having thus described several aspects of at least one embodiment of this invention, it is to be appreciated that various alterations, modifications, and improvements will readily occur to those skilled in the art.

Such alterations, modifications, and improvements are intended to be part of this disclosure, and are intended to be within the spirit and scope of the invention. Further, though advantages of the present invention are indicated, it should be appreciated that not every embodiment of the invention will include every described advantage. Some embodiments may not implement any features described as advantageous herein and in some instances. Accordingly, the foregoing description and drawings are by way of example only.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures, such as tables, may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A method for generating a triage dump in a computer system comprising a processor and at least one memory for storing data, wherein the at least one memory comprises a plurality of memory locations, the method comprising:
    identifying a first plurality of data values stored in the plurality of memory locations, wherein each of the first plurality of data values is characteristic of personal information; and
    overwriting each of the first plurality of data values with one or more overwrite values, wherein:
    an overwrite value for a first data value of the plurality of data values depends on the first data value;
    the overwrite value for the first data value is a first overwrite value when the first data value is within a first range of values; and the overwrite value for the first data value is a second overwrite value when the first data value is within a second range of values.

2. The method of claim 1, wherein the method further comprises:
identifying a second plurality of data values stored in the plurality of memory locations, wherein each of the second plurality of data values is characteristic of a pointer; and
leaving the second plurality of data values unmodified.

3. The method of claim 2, wherein:
for a second data value of the second plurality of data values, being characteristic of a pointer comprises the second data value corresponding to an address of a first memory location, wherein the first memory location is associated with program code, library code, or a call stack.

4. The method of claim 3, wherein:
a data value of the first memory location is a pointer, a handle, or heap data.

5. The method of claim 1, wherein:
the first range of data values comprises negative numbers having a magnitude exceeding a threshold.

6. The method of claim 1, wherein:
an overwrite value for a second data value of the plurality of data values depends on the second data value;
the overwrite value for the second data value is the first overwrite value when the second data value is within the first range of values; and
the overwrite value for the second data value is the second overwrite value when the second data value is within the second range of values.

7. The method of claim 2, wherein the method further comprises:
creating a triage dump comprising the second plurality of data values and the one or more overwrite values, but not the first plurality of data values.

8. The method of claim 7, wherein the method further comprises:
sending the triage dump to an external server.

9. The method of claim 1, wherein:
the method for generating the triage dump is initiated as a result of a program crashing or hanging.

10. A computing device comprising:
at least one processor for executing one or more computer programs;
at least one memory for storing data used by the one or more computer programs, wherein the at least one memory comprises a plurality of memory locations;
a triage dumping engine for creating a triage dump, the triage dumping engine comprising:
an identification engine for identifying a plurality of data values stored in the plurality of memory locations, wherein each of the plurality of data values is characteristic of personal information;
a selection engine for selecting overwrite values for each of the identified plurality of data values from a plurality of potential overwrite values; and
an overwrite engine for overwriting each of the identified plurality of data values with the selected overwrite values, wherein:
the selection engine selects an overwrite value for a first data value of the plurality of data values based on the first data value;
the selection engine selects a first overwrite value for the first data value when the first data value is in a first range of values; and
the selection engine selects a second overwrite value for the first data value when the first data value is in a second range of values.

11. The computing device of claim 10, wherein:
the first range of data values comprises negative numbers.

12. The computing device of claim 10, wherein:
the selection engine selects an overwrite value for a second data value of the plurality of data values based on the second data value;
the selection engine selects the first overwrite value when the second data value is within the first range of values; and
the selection engine selects the second overwrite value when the second data value is within the second range of values.

13. The computing device of claim 10, wherein the triage dumping engine further comprises:
a communication engine for sending the triage dump to an external server, wherein the triage dump comprises the selected overwrite values and another plurality of data values stored in the plurality of memory locations that are not characteristic of personal information.

14. At least one storage device having instructions recorded thereon which, when executed by a processor of a computing device, perform a method comprising:
receiving a triage dump from a remote computer, wherein the triage dump comprises:
pointer data comprising first data characteristic of pointers held in memory of the remote computer;
null pointer data characteristic of null pointers held in the memory of the remote computer; and
poisoned data values comprising one or more overwrite values, wherein the one or more overwrite values are different than a value of data characteristic of the null pointers; and
processing the triage dump to identify an error, the processing being based at least in part on the null pointer data.

15. The at least one storage device of claim 14, wherein:
wherein the one or more overwrite values comprise a predetermined value.

16. The at least one storage device of claim 14, wherein the method further comprises:
receiving, from the remote computer, information about the one or more overwrite values used in the triage dump.

\* \* \* \* \*